United States Patent Office 3,101,000
Patented Aug. 20, 1963

3,101,000
INTEGRATING LINEAR ACCELEROMETER
Sidney Lees, Newton, Mass.
(16 Eliot St., Cambridge, Mass.)
Filed Nov. 7, 1958, Ser. No. 772,582
4 Claims. (Cl. 73—503)

This invention relates to acceleration measuring devices and more particularly comprises a new and improved integrating linear accelerometer. The invention disclosed in this applicaiton may be considered an improvement over the invention disclosed in my copending application Serial No. 655,035 filed April 25, 1957, now Patent No. 3,008,334, of which this application constitutes a continuation in part.

The invention disclosed in my copending application, supra is an integrating linear accelerometer having an endless fluid passage subdivided into two compartments by a pair of thin and flexible diaphragms which extend across the passage. One of the compartments has a substantially larger cross sectional area than the other compartment and each compartment is filled with a Newtonian liquid. These liquids are of different density and by virtue of their relative positions in the passage displace in the passage as the instrument is subjected to accelerations.

I have demonstrated mathematically in my copending application that if the viscous damping coefficient is made very large compared to the mass of the liquid system and the elastic restraint acting on the liquids (such as may be caused by the diaphragms), the displacement of the liquid in the larger compartment with respect to the case is proportional to the instantaneous change in velocity of the instrument with respect to inertial space. This relationship may be expressed mathematically as follows:

(1)
$$x = \int_0^t -\frac{m}{c_d} \frac{d^2y}{dt^2} dt$$

Where
$x$=relative displacement of the liquid in the large compartment
$m$=effective mass of the liquid system
$c_d$=effective viscous damping coefficient
$y$=displacement of the case with respect to inertial space Because the viscous damping coefficient is directly proportional to the ratio of the squares of the cross sectional areas of the large and small compartments, the conditions for making Equation 1 the operative equation of the instrument are satisfied by the choice of the shape of the passage and the types of diaphragms located in the passage.

The form of linear integrating accelerometer disclosed in my copending application may for analysis be likened to two columns of liquid disposed side by side. Due to angular acceleration, an inertial reaction causes a condition that can be represented by a pressure difference in the two columns. This effective pressure difference due to angular acceleration in the two columns in fact constitutes an interfering input to the system. As a result, the displacement of the liquid in the compartment of larger cross section is a function not only of the linear change in velocity but of the angular acceleration as well. Therefore, for improved accuracy it is necessary to eliminate or compensate for this undesirable extraneous input.

The primary object of my invention is to provide an integrating linear accelerometer having an output which is insensitive to angular accelerations.

To accomplish this and other objects, one embodiment of my invention includes a closed and continuous passage in the form of a loop. A duct extends between and is in communication with two distinct parts of the passage and at least a part of the duct has a cross section substantially larger than that of the passage. The passage and the duct are made of rigid material and do not yield to any fluid pressures which may be impressed upon them. A pair of thin and flexible diaphragms extend across the enlarged part of the duct and isolate a portion of it from the remaining portion of the duct and the passage. These diaphragms readily yield without effective elastic restraint to pressures exerted on them. A Newtonian liquid fills the passage and the portions of the duct in communication with it while a second Newtonian liquid of different density fills the isolated portion of the duct. A signal generator disposed in the enlarged portion of the duct produces a signal proportional to the displacement of the liquid in it. In the detailed description, I demonstrate that angular accelerations imparted to the instrument have no effect upon the displacement of the liquid in the enlarged portion of the duct and that its displacement results solely from changes in linear velocity.

A second embodiment of my invention includes an integrating linear accelerometer identical to that disclosed in my copending application supra. An integrating angular accelerometer of the type disclosed in my copending application Serial No. 710,660 filed January 23, 1958, now Patent No. 2,983,149, is also provided in this second embodiment. Signal generators disposed in enlarged portions of the passages of each of the accelerometers direct their signals to a difference amplifier which subtracts the signal produced by the integrating angular accelerometer appropriately adjusted for the component accelerometer sensitivity from the signal produced by the integrating linear accelerometer. As a result, the extraneous portions of the signals from the integrating linear accelerometer are canceled and the signal produced by the difference amplifier is directly proportional to the instantaneous change in linear velocity alone.

These and other objects and features of my invention will be better understood and appreciated from the following detailed description of several embodiments thereof, selected for purposes of illustration and shown in the accompanying drawings in which.

Figure 1:
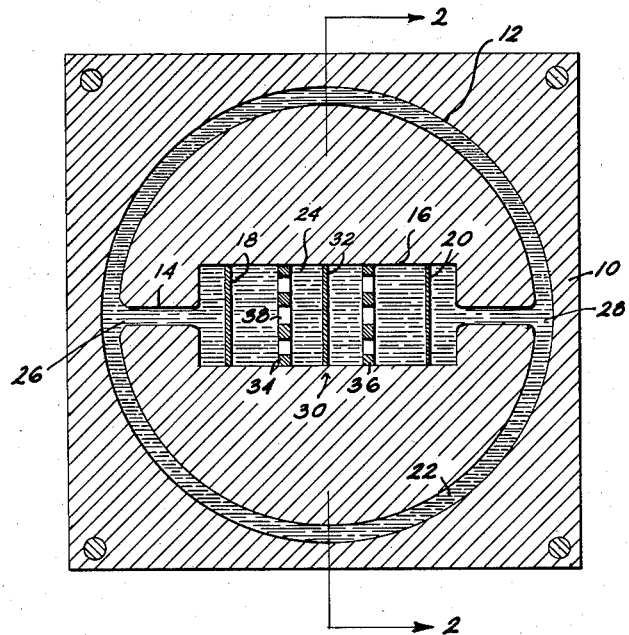
FIGURE 1 is a diagrammatic view in cross section of an integrating linear accelerometer constructed in accordance with my invention.
Figure 2:
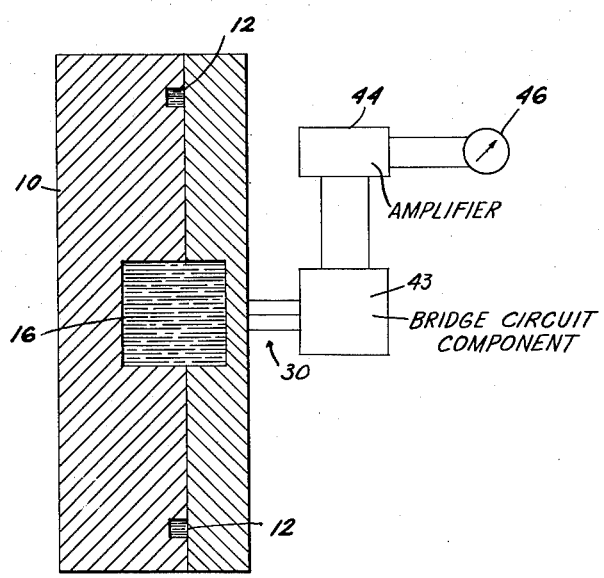
FIGURE 2 is a cross sectional view taken along the section line 2—2 of FIGURE 1.

The embodiment of my invention illustrated in FIGURES 1 and 2 includes a case 10 in which is formed a closed and continuous passage 12 which may be of substantially uniform cross section. Although the passage is illustrated as defining a circular path, it should be appreciated that the passage may define an endless path of any shape. A second passage 14 is also formed in the case 10 and its ends communicate with separate portions of the passage 12. The passage 14 includes a compartment 16 of enlarged cross section, and a pair of separated thin and flexible diaphragms 18 and 20 disposed in the passage physically isolate the compartment 16 from the remainder of the passage 14 and the circular passage 12. A Newtonian liquid 22 fills the endless passage 12 and the ends of the duct or passage 14 outside the diaphragms 18 and 20. A second Newtonian liquid 24 of different density fills the compartment 16.

It will be appreciated that if the case 10 is subjected to an angular acceleration about an axis which does not lie in a plane perpendicular to the axis of the loop described by the passage 12, the liquid 22 will displace in the passage 12. Although the acceleration causes the liquid to displace in the passage 12, no pressure drop exists between any two points in the passage. Thus, the pressures at the ends 26 and 28 of the duct 14 are the same, and there is no net pressure applied to the liquid in the duct 14 which would cause that liquid to displace.

Although the angular acceleration does not cause a displacement of the liquid in the duct 14, linear acceleration of the case along a path parallel to the duct 14 will cause the liquid in that duct to displace. For example, assume that the liquid 24 has a greater density than the liquid 22 and that the instrument is accelerated linearly to the right as shown in FIGURE 1. The liquid 24 will displace to the left relative to the case 10 and the liquid 22 will be forced to move to the right in the direction of the acceleration. Because the diaphragms 18 and 20 are thin and flexible, they will offer negligible resistance to the displacement of the liquids.

Figure 4:
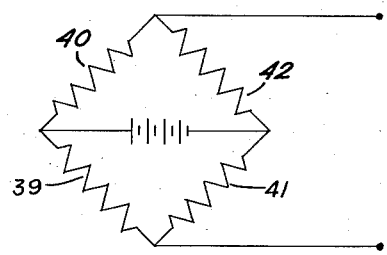
FIGURE 4 is a schematic diagram of the signal generator.

A signal generator 30 disposed in the compartment 16 senses the displacement of the liquid 24 and produces a signal proportional to that displacement. The signal generator includes a flexible diaphragm 32 disposed between a pair of rigid plates 34 and 36. The rigid plates 34 and 36 are perforated as suggested at 38 so as not to interfere with the displacement of the liquid 24 in the enlarged chamber. Because the diaphragm 32 is impervious to the liquid 24, and further, because it is extremely flexible it will displace with the liquid 24 and move toward either the plate 34 or the plate 36 depending upon the direction of displacement of the liquid. If the liquid 24 is electrically conductive, it will be appreciated by those skilled in the art that the displacement of the diaphragm 32 and thus the liquid 24 may be measured by means of a simple resistance bridge circuit. This bridge circuit is suggested in FIGURE 4 wherein the resistors 40 and 42 represent the conductive path through the liquid 24 between the diaphragm 32 and the plate 34 and between the diaphragm 32 and the plate 36, respectively. The signal produced by the bridge circuit may be amplified by the amplifier 44 and be directed to the meter 46 so that a direct measurement of the displacement may be available to an observer. The other resistors 39 and 41 and the power supply which form the bridge circuit shown in FIGURE 4 are represented by the box 43 in FIGURE 2.

It will be noted that the embodiment of my invention illustrated in FIGURE 1 includes the features outlined in the introduction which give rise to the operative relationship defined by Equation 1. That is, the diaphragms 18 and 20 exert negligible elastic restraint upon the displacement of the liquids, and the effective viscous damping coefficient $c_d$ is relatively large as compared to the effective mass of the liquid system by virtue of the large cross sectional area of the compartment 16 and the small cross sectional area of the passage 12.

To avoid other undesirable extraneous inputs, it is necessary that the viscous damping coefficient be invariant. Restated, the integrand in Equation 1 must not become $$\frac{1}{c_d} \frac{d^2y}{dt^2}$$

Because the viscous damping coefficient is a function of the ratio of the squares of the two cross sectional areas and the viscous coefficient of the liquid, the geometry of the structure must be invariant and Newtonian liquids must be employed. Thus, the instrument includes Newtonian liquids as the seismic element and the liquid passages are defined by rigid walls. From the foregoing it will be recognized that the signal recorded at the meter 46 is proportional to the instantaneous change in linear velocity of the instrument and is uneffected by angular accelerations.

Figure 3:
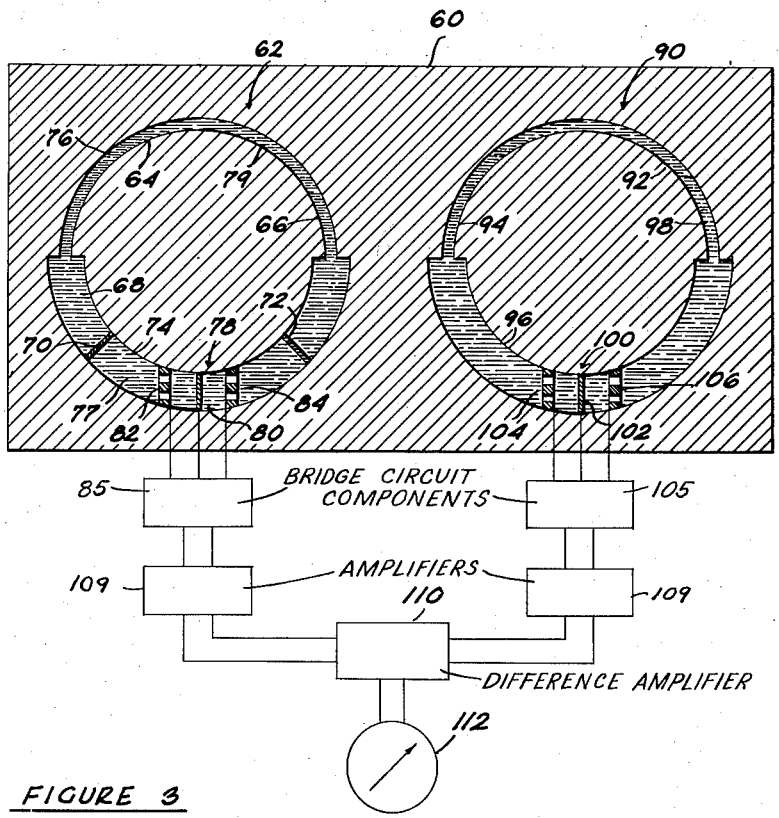
FIGURE 3 is a diagrammatic view in cross section of another embodiment of my invention.

In FIGURE 3 I have illustrated an alternative embodiment of my invention. In this embodiment, an integrating angular accelerometer and an integrating linear accelerometer are formed independently in a case 60. The linear integrating accelerometer 62 having all of the characteristics described above for creating the desired relationship between liquid displacement and instantaneous change in velocity of the case includes an endless passage 64 having a portion 66 of relatively small cross sectional area and a second portion 68 of larger cross sectional area. A pair of thin and flexible diaphragms 70 and 72 extend across the enlarged portion 68 of the passage 64 and divide the passage into two non-communicating compartments 74 and 76. The compartment 74 having a uniformly large cross sectional area is filled with a Newtonian liquid 77 and the compartment 76 is filled with a second Newtonian liquid 79 of different density. A signal generator 78 including a diaphragm 80 and a pair of fixed plates 82 and 84 substantially identical to those described in connection with the preferred embodiment of FIGURE 1 are disposed within the compartment 74 and produce a signal proportional to the displacement of the liquid in that compartment. The other resistors of the bridge circuit of the generator as well as the power supply, are represented by box 85. Because the pressure drop in the passage 66 caused by angular acceleration of the case 60 contributes to the displacement of the liquid in the compartment 74, the signal produced by the signal generator is not the result of a change in linear velocity of the case alone. Rather, the signal is proportional to the sum of the pressure drops in the passage caused by linear and angular accelerations. Thus, to obtain a signal proportional to the change in linear velocity alone, it is necessary to subtract from the signal that part which results from the change in angular velocity. The integrating angular accelerometer 90 formed in the case 60 makes this possible.

The integrating angular accelerometer includes a passage 92 which may be identical to the passage 64 in the integrating accelerometer 62. The passage 92 has a portion of reduced cross section 94 and a second portion 96 of substantially greater cross section. A Newtonian liquid 98 fills the entire passage 92, and as I have described in my copending application Serial No. 710,660, the displacement of the Newtonian liquid in the enlarged portion 96 of the passage is directly proportional to the change in angular velocity of the case. A signal generator 100 having a diaphragm 102 and a pair of fixed perforated plates 104 and 106 are disposed in the enlarged portion 96 of the passage and render a signal proportional to the displacement of the liquid. This signal generator may be identical to the signal generator 98 in the integrating linear accelerometer. The other resistors of the generator and its power supply are represented by the box 105.

It will now be appreciated that the case 60 includes two integrating accelerometers, one of which produces a signal proportional to the sum of pressure drops in the passage effected by changes in angular velocity as well as changes in linear velocity while the second integrating accelerometer produces a signal proportional to the change in angular velocity alone. Therefore, to obtain a signal proportional to the change in linear velocity, it is only necessary to subtract one of the signals from the other. Before the subtraction is performed, it is of course necessary to appropriately adjust one or both of the signals for the sensitivities of each device. Amplifiers of standard design connected to the outputs of the signal generators may make the necessary adjustments. These amplifiers are suggested by the boxes 109 in FIGURE 3.

The difference amplifier 110 connected to the outputs of the amplifiers 109 is of standard design and performs the subtraction. That is, the adjusted signal produced by the generator 78 is reduced by an amount equal to the adjusted signal produced by the generator 100. The difference signal is relayed to a meter 112 which indicates the signal caused by the change in linear velocity alone.

Those skilled in the art will now appreciate that I have provided several means of obtaining measurements of changes in linear velocity uneffected by changes in angular velocity. Numerous modifications may be made of these embodiments without departing from the spirit of my invention. For example, the signal generators may be of any type and measure the displacement of the liquid capacitatively as well as by other means. Therefore, I do not intend to limit the scope of my invention to the specific embodiments illustrated and described. Rather, I intend that the breadth of my invention be determined by the appended claims and their equivalents. What I claim as new and desire to secure by Letters Patent of the United States is:

1. An integrating accelerometer for measuring changes in linear velocity comprising a closed and continuous passage, a duct interconnecting two separated points of the passage, said duct having a portion which is of substantially greater cross sectional area than the passage, a pair of thin and flexible diaphragms isolating at least a part of the enlarged portion of the duct from the other part of the duct and the passage, a Newtonian liquid filling the passage and the portion of the duct in communication with it, a second Newtonian liquid of different density filling the isolated portion of the duct, and a signal generator operatively connected to the enlarged portion of the duct and producing a signal which is a function of the displacement of the second Newtonian liquid in response to a change in velocity of the case.

2. A device of the class described comprising a case, an endless passage formed in the case, a pair of thin and flexible diaphragms extending across the passage and dividing the passage into two separate compartments, Newtonian liquids of different density filling each compartment, a signal generator operatively associated with one of the liquids producing a signal proportional to the displacement of that liquid in response to a change in velocity of the case, and means including a second passage filled with liquid connected at its ends to the same compartment on opposite sides of the compartment containing said one liquid for preventing displacement of said one liquid in response to changes in angular velocity of the case.

3. A device of the character described comprising a case, a passage formed in the case, flexible means extending across different parts of the passage and defining a closed chamber in the passage, a Newtonian liquid filling the chamber, a second Newtonian liquid filling the remaining portion of the passage, means connected to the ends of the passage defining a closed loop filled with liquid preventing changes in angular velocity of the case from displacing the liquid in the chamber, and means operatively associated with the liquid in the chamber providing a signal proportional to the displacement of that liquid resulting from changes in linear velocity of the case.

4. A device of the character described comprising a case, an endless passage formed in the case, a pair of diaphragms extending across the passage and dividing the passage into a pair of compartments, Newtonian liquids of different density filling the compartments, an electrical device operatively associated with the liquid in one of the compartments, and having an output signal which is a function of the displacement of the liquid in that compartment, and another passage having its ends connected to the endless passage on opposite sides of that compartment and defining with the other compartment a second endless passage in which the liquid in said other compartment may displace in response to angular acceleration without displacing the liquid in said one of the compartments.

References Cited in the file of this patent

UNITED STATES PATENTS

| 2,487,793 | Esval et al. | Nov. 15, 1949 |
| 2,878,006 | Sedgfield et al. | Mar. 17, 1959 |
| 2,907,560 | Stedman | Oct. 6, 1959 |

FOREIGN PATENTS

| 894,778 | Germany | Oct. 29, 1953 |